(12) United States Patent
Comte (10) Patent No.: US 10,893,644 B2
(45) Date of Patent: Jan. 19, 2021

(54) GRAIN STORAGE BIN WITH AERATION SYSTEM

(71) Applicant: Alain Comte, Notre-Dame (CA)

(72) Inventor: Alain Comte, Notre-Dame (CA)

( * ) Notice: Subject to any disclaimer, the term of this patent is extended or adjusted under 35 U.S.C. 154(b) by 98 days.

(21) Appl. No.: 16/057,959

(22) Filed: Aug. 8, 2018

(65) Prior Publication Data

US 2019/0021232 A1 Jan. 24, 2019

Related U.S. Application Data

(63) Continuation-in-part of application No. 15/826,145, filed on Nov. 29, 2017, now Pat. No. 10,473,394.

(60) Provisional application No. 62/448,624, filed on Jan. 20, 2017.

(51) Int. Cl.

| | | |
|---|---|---|
| *F26B 3/00* | (2006.01) | |
| *A01F 25/22* | (2006.01) | |
| *B65D 88/74* | (2006.01) | |
| *F26B 17/14* | (2006.01) | |
| *F26B 9/06* | (2006.01) | |
| *B65D 90/08* | (2006.01) | |
| *B65D 90/02* | (2019.01) | |
| *B65D 88/26* | (2006.01) | |

(52) U.S. Cl.
CPC .............. *A01F 25/22* (2013.01); *B65D 88/26* (2013.01); *B65D 88/742* (2013.01); *B65D 88/745* (2013.01); *B65D 90/024* (2013.01); *B65D 90/08* (2013.01); *F26B 9/063* (2013.01); *F26B 17/1425* (2013.01); *F26B 2200/06* (2013.01)

(58) Field of Classification Search
CPC ....... A01F 25/22; B65D 88/26; B65D 88/745; B65D 90/024; B65D 90/08; B65D 88/742; F26B 9/063; F26B 9/066; F26B 9/10; F26B 17/1425; F26B 17/1458; F26B 2200/06; F26B 2200/08
USPC .......................................... 34/487, 443, 413
See application file for complete search history.

(56) References Cited

U.S. PATENT DOCUMENTS

| | | | | |
|---|---|---|---|---|
| 1,696,854 | A * | 12/1928 | Ludwig ................ | B65D 88/742 454/182 |
| 2,548,262 | A * | 4/1951 | Hintz .................. | F26B 17/1425 34/171 |
| 5,167,081 | A * | 12/1992 | Loyns ..................... | F26B 9/085 34/170 |
| 2011/0121126 | A1* | 5/2011 | Mercer .................. | B64C 27/57 244/17.13 |

\* cited by examiner

*Primary Examiner* — John P McCormack
(74) *Attorney, Agent, or Firm* — Adrian D. Battison; Ade & Company Inc.; Ryan W. Dupuis (57) ABSTRACT

A grain storage bin includes a cylindrical wall formed by a plurality of panels arranged in rows with a bottom edge of a first row bolted to a top edge of a second lower row. At each joint the bottom edge of the first upper row is overlapped with and outside of the outer surface of top edge of the second lower row and the bottom edge is fastened to the top edge by bolts carrying spacers as to define a first channel along the joint for passage of air. A central air injection duct is formed of a series of generally frustoconical duct pieces arranged in a row suspended on a cable from the roof with a tube portion into which the air is injected fixed on legs at a hopper bottom standing upwardly therefrom. The cable is connected by a spring at the bottom to maintain tension.

25 Claims, 7 Drawing Sheets

GRAIN STORAGE BIN WITH AERATION SYSTEM

The present invention relates a storage bin with an aeration system to provide ventilation of particulate materials disposed in the storage bin.

BACKGROUND OF THE INVENTION

After harvest grain such as, for example, wheat, rye, barley, canola, soybeans, is stored in storage bins, either on site at a farm or in large commercial storage facilities, prior distribution for processing or sale. Typically, the grain is stored in the storage bins during fall and winter.

Temperature changes due to changing seasons result in an unequal temperature distribution within the grain stored inside the storage bin causing natural convection of air through the grain and causing moisture to migrate therewith. The moisture then gathers in the top portion of the stored grain causing it to spoil. Depending on the temperature and the moisture content of the grain spoilage occurs within weeks or even days.

To prevent spoilage of grain stored in storage bins grain aeration systems or grain drying systems are employed. In grain aeration systems typically a fan provides a flow of outside air into and through the stored grain. Unfortunately, aeration systems are relatively complex and expensive to manufacture, install, and operate. Furthermore, in conditions of high humidity of the outside air the aeration is ineffective in preventing spoilage of the grain. Grain drying systems are more effective in humid conditions of the outside air, but are even more expensive to operate than aeration systems and care must be taken that the stored grain is not damaged due to too high temperatures of the heated air provided by the grain drying system.

Some systems use a fan to generate an air flow and others use natural convection to effect the movement of the air. In some cases the air moves inwardly from the wall to a center discharge duct and in other cases the air flow moves outwardly from a center duct to the wall.

One problem of systems of this type is that of allowing air to flow either inwardly or outwardly at the bin wall. Perforations through the wall must prevent prevents penetration of water and escape of the grain.

SUMMARY OF THE INVENTION it is an object of the present invention to provide a storage bin with a built in air flow system.

According to a first aspect of the invention there is provided an aeration apparatus for mounting in a storage bin for particulate material where the storage bin comprises a bin wall standing up from a bin bottom and a bin roof covering a top edge of the bin wall;

the aeration system comprising:
an air injection conduit for supplying air under pressure;
an elongate duct for mounting within the bin at a position spaced inwardly from the bin wall;
the duct comprising a series of generally frustoconical duct pieces arranged in a row from a position adjacent the roof to a position adjacent the bin bottom;
a support system for attaching an upper end of the duct to the roof to be suspended therefrom;
each of the duct pieces having a bottom mouth larger than a top mouth so that the top mouth of each fits inside the bottom mouth of the next upper duct piece so that air from the conduit injected into the duct can escape between the duct pieces while particulate material in the bin is prevented by overlap between the duct pieces from entering the open top mouth;
a tube portion at the bin bottom arranged to be fixed thereto standing upwardly therefrom;
the conduit being arranged to inject said air under pressure into the tube;
an upper end of the tube being arranged to project into the open bottom mouth of a bottom one of the pieces.

According to a second aspect of the invention there is provided an aeration apparatus for mounting in a storage bin for particulate material where the storage bin comprises a bin wall standing up from a bin bottom and a bin roof covering a top edge of the bin wall;

the aeration system comprising:
an air injection conduit for supplying air under pressure;
an elongate duct for mounting within the bin at a position spaced inwardly from the bin wall;
the duct comprising a series of generally frustoconical duct pieces arranged in a row from a position adjacent the roof to a position adjacent the bin bottom;
a support system for attaching an upper end of the duct to the roof to be suspended therefrom;
each of the duct pieces having a bottom mouth larger than a top mouth so that the top mouth of each fits inside the bottom mouth of the next upper duct piece so that air from the conduit injected into the duct can escape between the duct pieces while particulate material in the bin is prevented by overlap between the duct pieces from entering the open top mouth;
wherein the support system comprises a cable passing centrally through the duct pieces and suspended at an upper end from the roof and connected to each duct piece so as to carry the duct pieces in the row.

Preferably the tube is spaced from the bin bottom so that the system can be used where the bin bottom is a conical hopper bottom with a discharge opening at an apex of the hopper bottom and with the tube having a bottom end located above the discharge opening.

Preferably the tube is connected to the hopper bottom by a plurality of inclined legs at spaced positions around the discharge opening.

Preferably the support system comprises a cable passing centrally through the duct pieces and suspended at an upper end from the roof and connected to each duct piece so as to carry the duct pieces in the row for example by arms extending outwardly from the cable.

Preferably the cable is connected at a bottom end to the bin bottom so as to be under tension and the cable is connected to a spring to provide the tension therein. Preferably the spring is connected from a bottom end of the cable to a cross member at the bin bottom.

Preferably the conduit connects to a side of the tube as this allows the cable and spring to pass through the tube. Alternatively the conduit can attach at the bottom of the tube and the bottom of the cable terminate above the conduit within the tube.

Preferably the air injection system is used with an arrangement in which the bin wall has a series of perforated openings which allow escape of the air form the duct.

For example, the above features can optionally be used with a storage bin for particulate material comprising:
a bin wall formed by a plurality of wall panels arranged in rows with a bottom edge of a first upper row bolted to a top edge of a second lower row to form a plurality of stacked rows with a joint between each row and the next;

the bin wall defining an inner surface facing inwardly to an interior of the bin for confining the material and an outer surface at the exterior of the bin;

at each joint the bottom edge of the first upper row being overlapped with and outside of the outer surface of top edge of the second lower row;

the bottom edge being fastened to the top edge in an overlapped position and spaced outwardly from the top edge so as to define a first channel therebetween extending along the joint for passage of air therebetween;

and a cover strip overlying the channel and extending from an upper edge of the strip at the inner surface of the first upper panel above the channel to a lower edge of the strip;

the lower edge of the strip being spaced inwardly of the inner surface of the second lower panel so as to define a second channel therebetween extending along the joint for passage of air therebetween;

whereby air can pass between the interior and the exterior through the first and second channels while the particulate material is prevented from escaping through the first channel by the cover strip.

Preferably the cover strip comprises an angle member having an upper flange inclined upwardly and outwardly to the upper edge thereof and a lower depending leg.

Preferably the cover strip is a separate component attached by fasteners to one of the panels. However it is possible in some other arrangements that the cover strip is formed as an integral component with either the upper panel or with the lower panel so that when the panels are bolted together the cover strip is arranged over the second channel and is held spaced from the top edge of the lower panel. This can be achieved by welding the top edge of the cover strip as a piece extending along the bottom edge of the upper panel.

However, most conveniently, the cover strip is a separate component attached by fasteners to the second lower panel adjacent the top edge thereof. In this way the edge of the cover strip extends across the channels to the inside surface of the of the panel which it contacts and is pressed against by spring force to maintain constant engagement with the inside surface to prevent the escape of the grain.

Preferably there is provided a plurality of longitudinally separated spacers between a lower part of the cover strip and the inner surface of the second lower panel. The spaces hold the cover strip away from the second panel to maintain the second channel.

Most conveniently the spacers are mounted at the fasteners such as by providing a collar mounted on a bolt between the cover strip and the second lower panel. However the spacers can be provided separately from the fasteners.

Preferably the bottom edge is fastened to the top edge in the overlapped position and spaced outwardly from the top edge by a plurality of fasteners at spaced positions along the joint. Again preferably each of the fasteners includes a spacer holding the top edge and bottom edge spaced.

Again, preferably, each fastener comprises a bolt passing through aligned holes in the first panel and the second panel with each spacer comprising a collar mounted on the bolt between the first panel and the second panel.

Typically the bolt which fastens the cover strip to the lower panel is the same bolt which fastens the lower panel to the upper panel with the bolt carrying a spacer to define the first channel and a second spacer to define the second channel. However other arrangements for mounting the components are possible including separate fasteners and/or separate spacers, and in some cases permanent attachment of one component to the other such as the attachment of the cover strip to one or other of the panels.

The storage bin can be of the type where the panels are flat or where the panels include horizontal corrugations.

The above air passage system can be used in conjunction with the arrangement in which the bin includes an air blower for injecting air into the bin which escapes through the channels. Such an air blower can be mounted at any suitable location within the bin including a central duct attached to the blower or using an underfloor blower system. When used with a hopper bottom bin, air Inlet injectors can be mounted at the hopper bottom, typically along the inside surface of the hopper bottom from an exterior mounted blower connected to the injectors. In this way the air entering the bin from the supply system passes through the stored grain and a can readily escape through the wall of the bin.

The above air passage system can be used in conjunction with the arrangement in which the bin includes an air vacuum for extracting air from the bin which enters through the wall. Typically an air extraction system of this type is located at the centre of the bin as a centre perforated duct which extends upwardly within the bin to an extraction fan either within the bin or externally.

In some cases the bin includes an air flow system in the bin of the above type which generates insufficient flow through the channels to cause constant flow through the wall either inwardly or outwardly so that exterior air pressure from a prevailing wind direction can cause air to enter through one part of the wall and air to escape through other parts of the wall. This can of course also occur when there is no airflow system provided to the bin so that natural airflow generated by exterior wind movement can cause air flow across the bin entering at one side and discharging at the other with the wall providing the perforations necessary for this airflow to occur.

In most cases the bin wall is cylindrical. But other bin shapes can be used.

Typically each row includes a plurality of panels arranged edge to edge along the row.

This arrangement therefore provides airflow channels in the bin wall at spaced positions along the height of the bin wall at each joint between one row and the next. The channels extend around the full periphery of a cylindrical bin or along the full length of a bin wall of other shape. This arrangement obviates the necessity for other venting systems in the walls which typically require formation of a cut hole in the wall and the covering of the hole with a suitable covering system which prevents penetration of water and escape all the grain.

The arrangement in which the upper panel is overlapped with the lower panel and extends on the exterior side of the lower panel necessarily prevents the penetration of water running downwardly along the outer surface of the bin wall.

The system is inexpensive and is installed as a part of the structure during the initial installation process. The system avoids the necessity for cutting the panels which can of course reduce panel strength.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
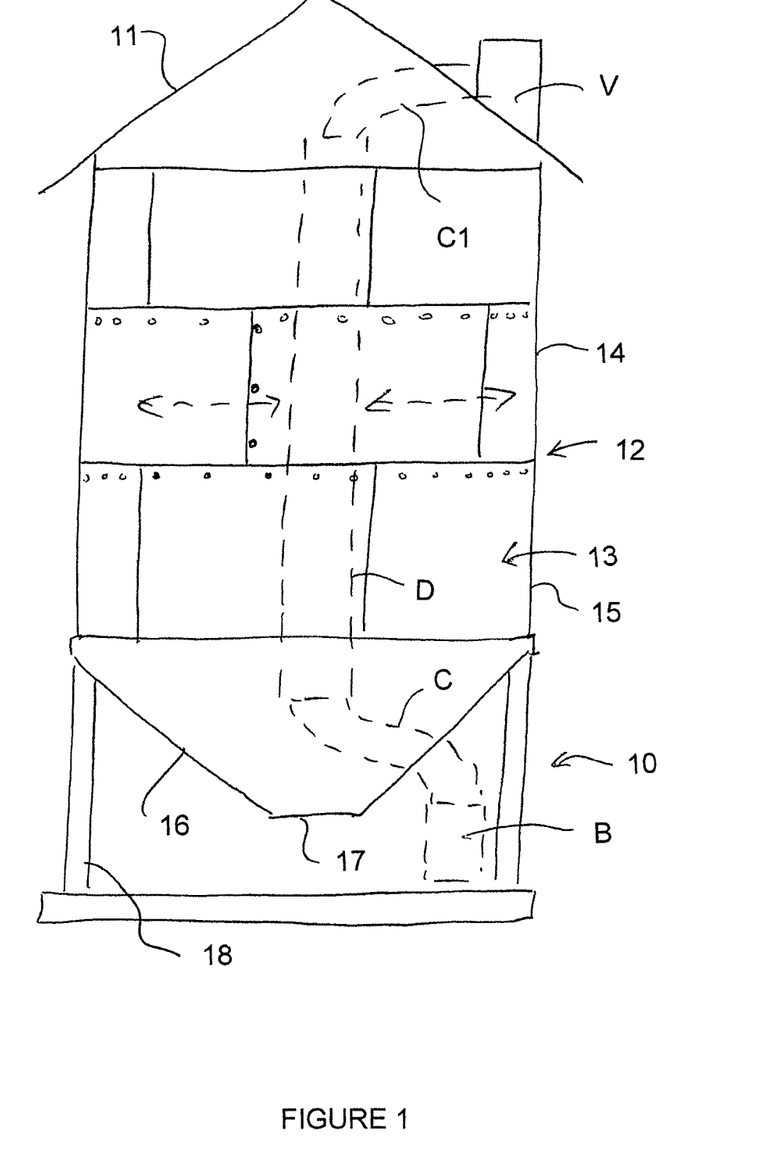
FIG. 1 is a schematic side elevational view of a bin of the present invention.
Figure 2:
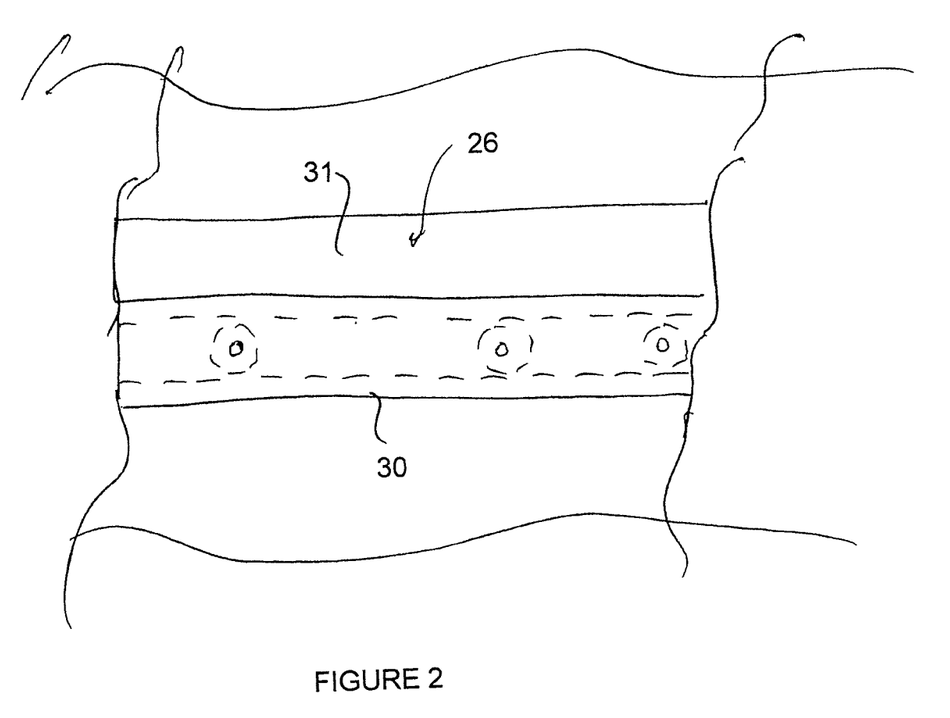
FIG. 2 is an elevational view from the interior of a portion of the bin wall of FIG. 1 showing the cover strip.
Figure 3:
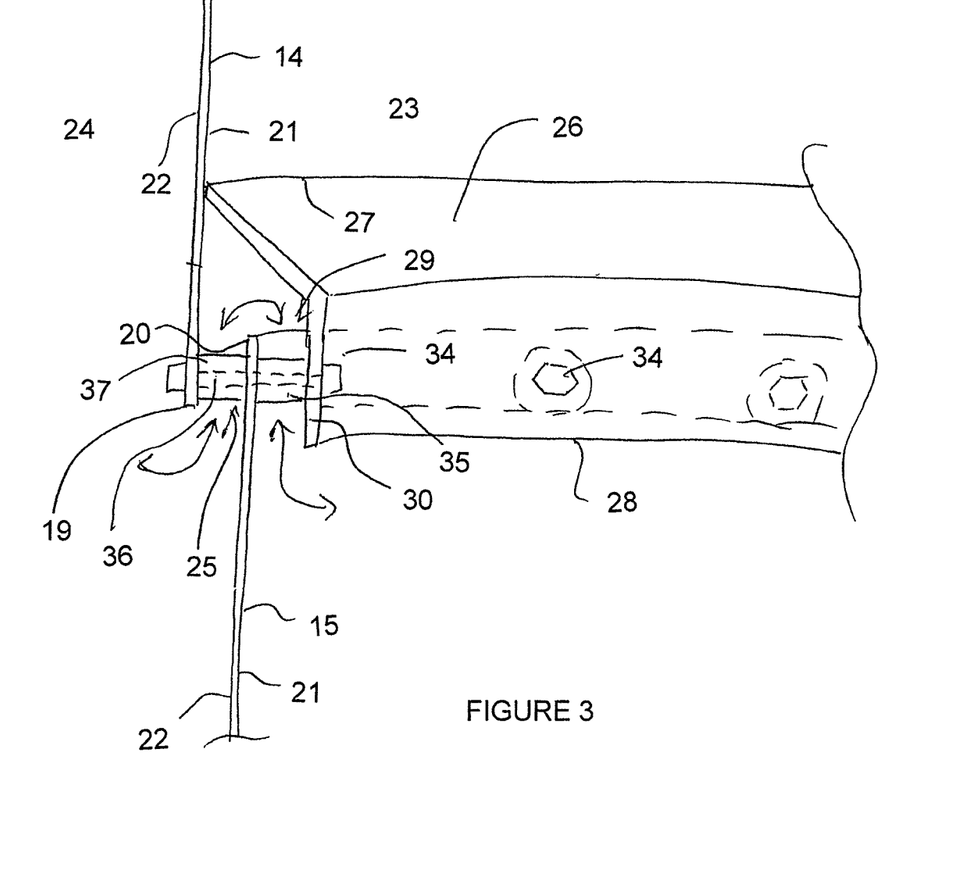
FIG. 3 is an isometric view of one portion of the bin wall of FIG. 1 at the cover strip showing a part of the wall in section of a first embodiment of the present invention.
Figure 4:
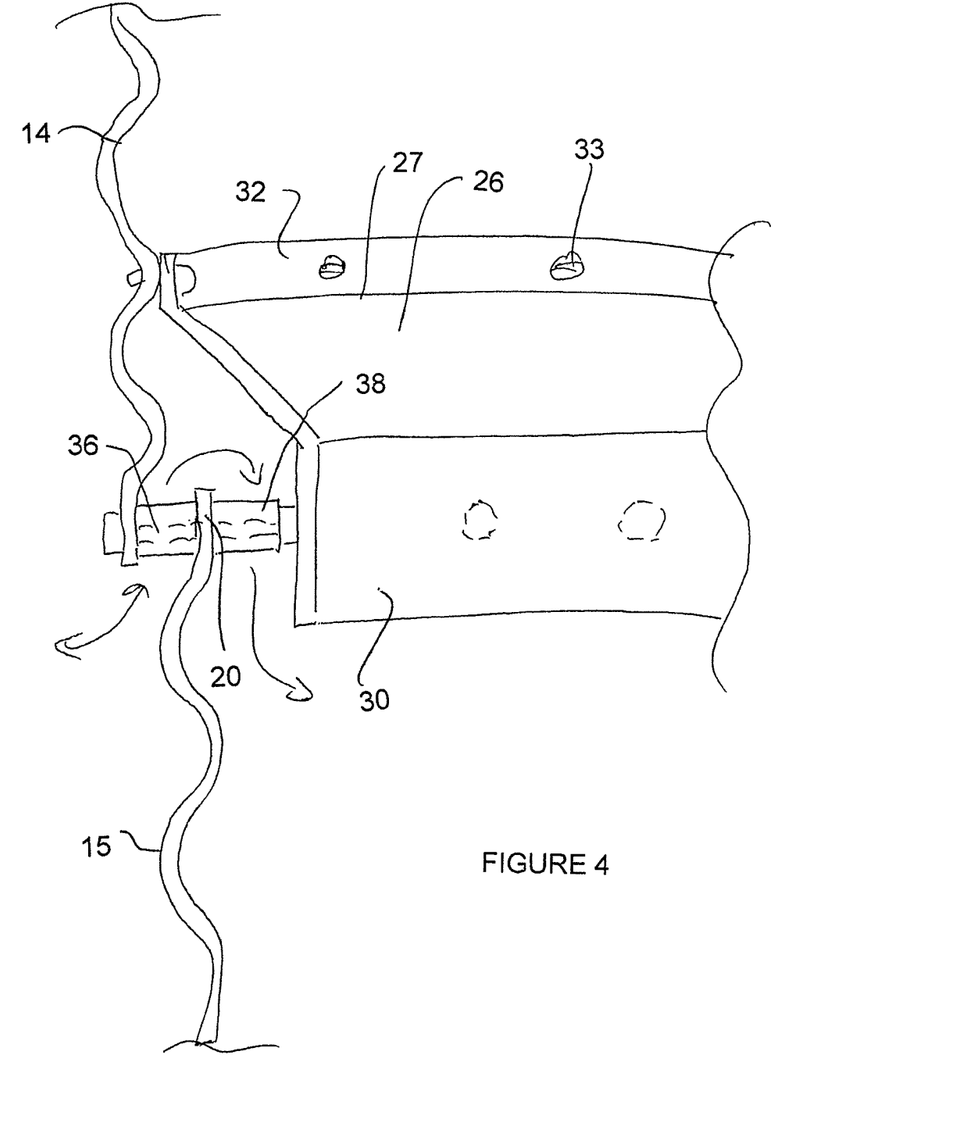
FIG. 4 is an isometric view of one portion of the bin wall of FIG. 1 at the cover strip showing a part of the wall in section of a second embodiment of the present invention.

A storage bin for particulate material includes a conventional bin arrangement with a base 10, 11 and a bin wall 12. The bin wall is formed by a plurality of wall panels 13 arranged in rows 14 and 15 etc. The panels can be flat panels as shown in FIG. 3 or can be corrugated panels as shown in FIG. 4. The base can be a simple flat pad or, as shown in FIG. 1, can include a hopper bottom 16 converging into a discharge opening 17 or mounted on a suitable support structure 18. All of these components are well known to a person skilled in this art so that further description of these conventional components is not necessary.

Each row can be formed by a single panel or more typically by series of panels connected edge to edge around the extent of the wall. In most cases the bin wall forms a cylindrical shape for structural reasons but the same arrangement can be applied to a bin of other shapes including a flat wall.

The panels of the row are connected with a bottom edge 19 of a first upper row 14 bolted to a top edge 20 of a second lower row 15 to form a plurality of stacked rows with a joint between each row and the next.

The bin wall defines an inner surface 21 facing inwardly to an interior 22 of the bin for confining the material and an outer surface 23 at the exterior 24 of the bin.

At each joint the bottom edge 19 of the first upper row is overlapped with and outside of the outer surface of top edge 20 of the second lower row so that there is a tendency for any water from rain or other conditions on the outside surface 22 to run down on upper panel and to discharge from the bottom edge outwardly of the lower panel.

The bottom edge 19 is fastened to the top edge 20 in the overlapped position and spaced outwardly from the top edge so as to define a first channel 25 therebetween extending along the full length of the joint for passage of air from the exterior into a location at the inner surface of the upper panel 14.

A cover strip 26 overlies the channel 25 and extends from an upper edge 27 of the strip at the inner surface 21 of the first upper panel 14 above the channel 25 to a lower edge 28 of the strip which is below the top edge 20 and extends generally parallel to the panel 15 at a position spaced inwardly of the inner surface 21 of the second lower panel 15 so as to define a second channel 29 extending along the joint between the inner surface of the second panel 15 and the lower leg portion 30 of the strip 26 for passage of air. In this way air can pass between the interior and the exterior through the first and second channels while the particulate material is prevented from escaping through the first channel by the cover strip.

The cover strip shown in FIGS. 3 and 4 comprises an angle member 26 having an upper flange 31 inclined upwardly and outwardly to the upper edge 27 thereof and a lower depending leg 30. The cover strip is therefore a separate component attached by fasteners to one of the panels. In FIG. 4 the cover strip 26 is attached to the bin wall at a flange 32 at the top edge 27 where the flange 32 is bolted to the panel 15 by screw fasteners. Also in FIG. 4 is shown the arrangement where the panels 14 are horizontally corrugated typical for galvanized bin walls.

In FIG. 3 the cover strip 26 is a separate component and in this case the strip is attached by fasteners 34 to the second lower panel 15 adjacent the top edge 20 thereof.

In this embodiment the fasteners 34 act to connect both the bottom edge 19 to the top edge 20 and also the cover strip to the top edge 20. In order to maintain the lower leg 30 of the cover strip separated from the top part 20 of the panel 15 there is provided a plurality of longitudinally separated spacers 35 between the lower part 30 of the cover strip and the inner surface 21 of the second lower panel. In this embodiment, therefore the spacers 35 are mounted at the fasteners in the form of a collar mounted on a bolt 36 between the cover strip and the second lower panel forming the fastener 34.

Also the bottom edge 19 is fastened to the top edge 20 in the overlapped position and spaced outwardly from the top edge by the same plurality of fasteners 34 defined by bolts 36 at spaced positions along the joint with each of the fasteners includes a spacer 37 holding the top edge and bottom edge spaced.

In this way each fastener 34 comprises a bolt 36 passing through aligned holes in the first panel and the second lower panel with each spacer 37 comprising a collar mounted on the bolt between the first panel and the second lower panel and there is provided a plurality of longitudinally separated spacers 35 between the lower part of the cover strip and the inner surface of the second lower panel.

As shown in FIG. 3 the panels are flat, however as shown in FIG. 4 the panels include horizontal corrugations. Also as shown in FIG. 4, where the cover strip 26 is attached to the upper panel 14, there is no requirement for a fixed attachment of the leg portion 30 of the cover strip. In this case the spacer required between the leg portion 30 and the top edge 20 can be provided by engagement of the leg 30 with a spacer 38 provided on the bolt 36 with the leg 30 engaging the head of the bolt 36 to prevent it being compressed by the weight of grain against the panel 15.

The arrangement therefore described above provides a series of slots or bin openings at the joints between each panel and the next adjacent panel. In order to use this in a bin aeration system for drying the crop, the bin can include as shown in FIG. 1 an air blower B for injecting air into the bin which escapes through the channels. In this alternative, the blower is located outside the bin for example underneath the hopper bottom 16. The blower is connected to a centre duct D by a conduit C so that air from the blower enters the centre duct D and escapes into the grain to discharge through the slots at the joints.

As an alternative the bin includes an air vacuum V for extracting air from the bin which enters through the openings at the joints. That is, air is drawn from the centre duct D through a conduit C1 to the vacuum V so that the air entering the perforated duct D is drawn through the grain from the slots at the joints.

In some cases the rate of airflow is such that the air passes continually either into or out of the bin slots. However in some cases, the bin includes an air flow system in the bin which generates insufficient flow through the wall to cause constant flow through the wall so that exterior air pressure from a prevailing wind direction can cause air to enter through part of the wall and air to escape through other parts of the wall. Also the same aeration system using the prevailing wind can be used without any internal airflow generating system so the whole of the aeration is caused by the transverse flow of air generated by variations in air pressure exterior of the bin.

Figure 5:
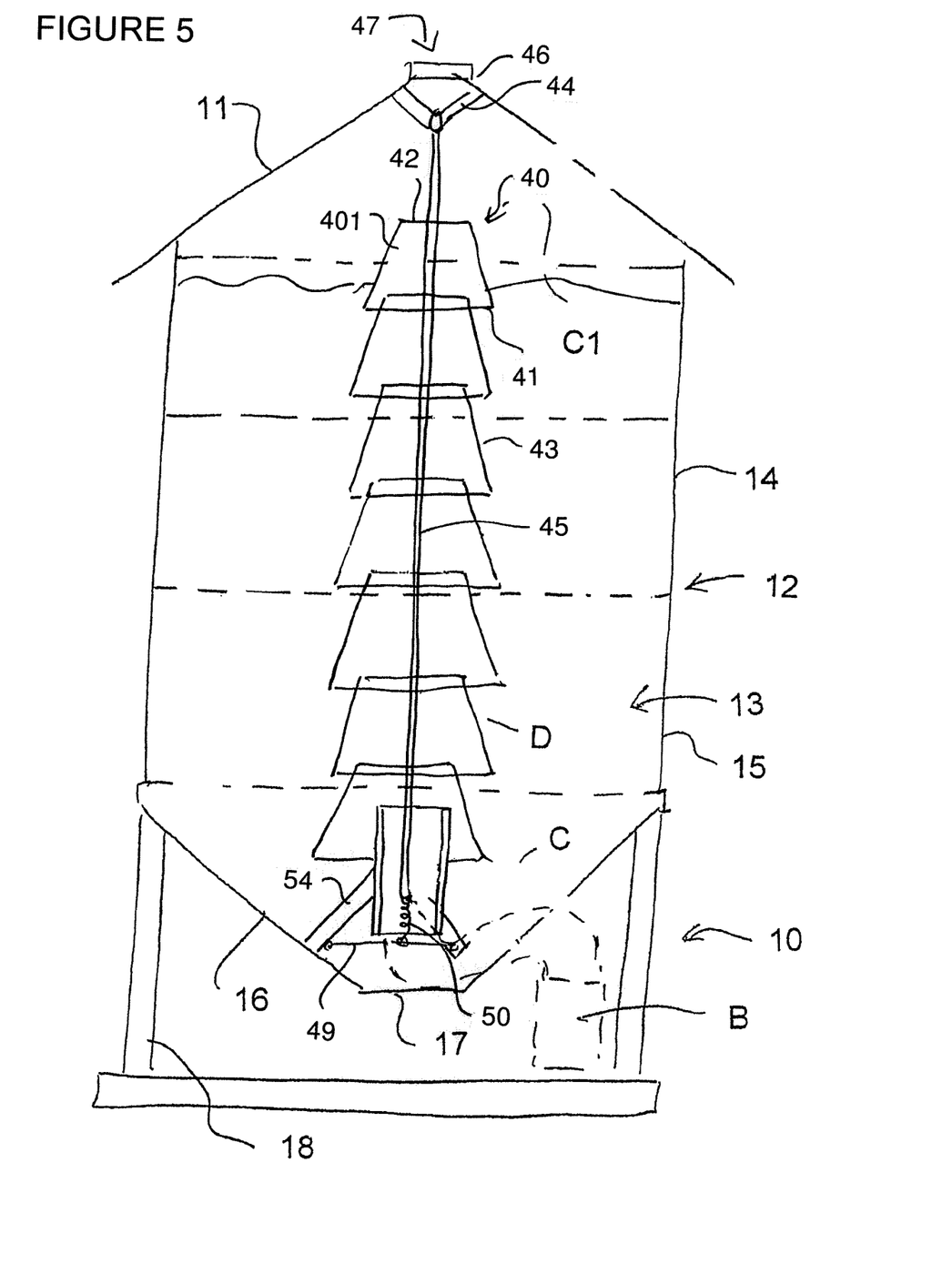
FIG. 5 is a cross-sectional view similar to FIG. 1 showing in more detail the construction of a enter duct through which air is injected into the bin.
Figure 6:
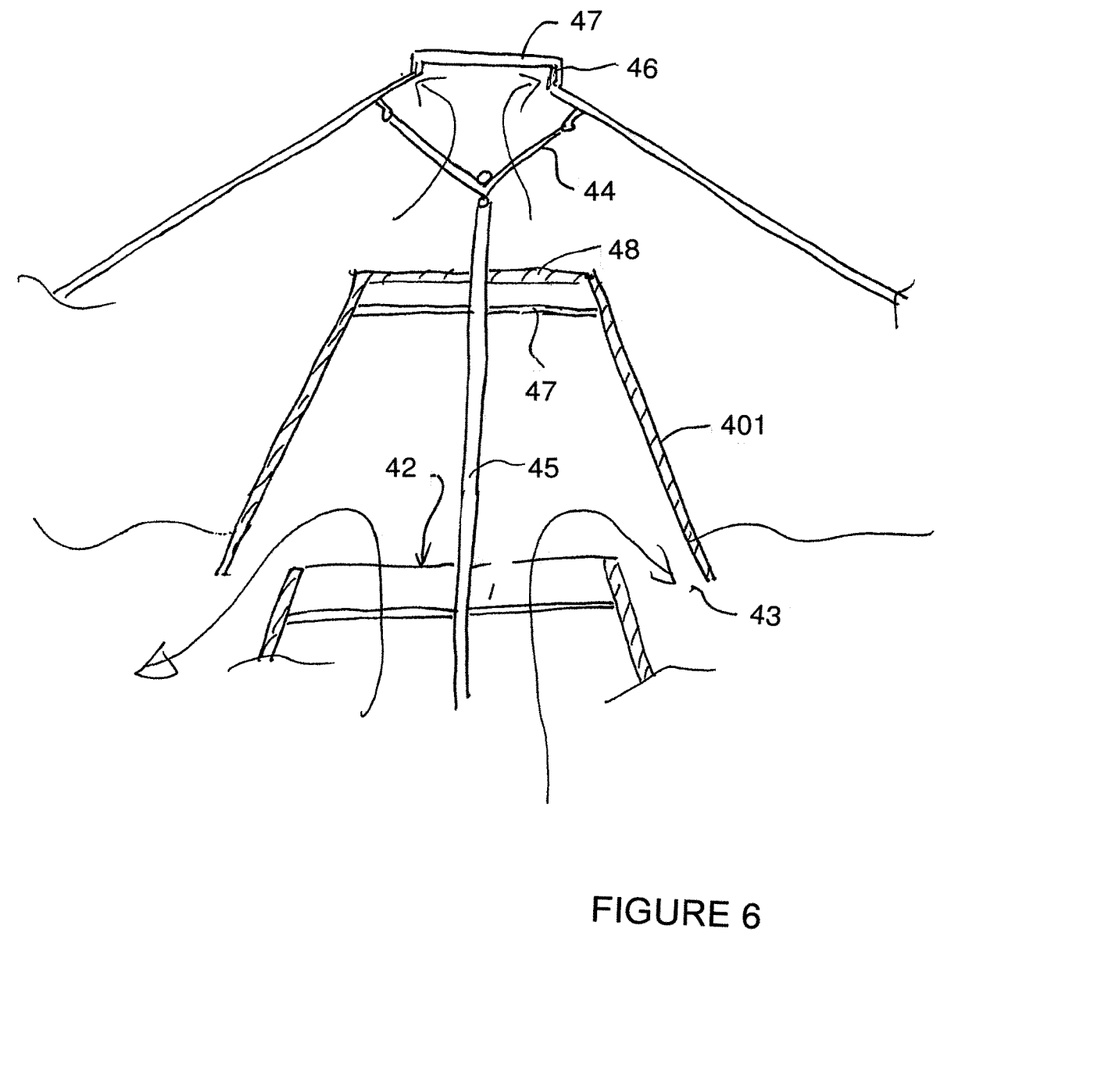
FIG. 6 is a cross-sectional view on an enlarged scale of the upper part of the duct of FIG. 5.
Figure 7:
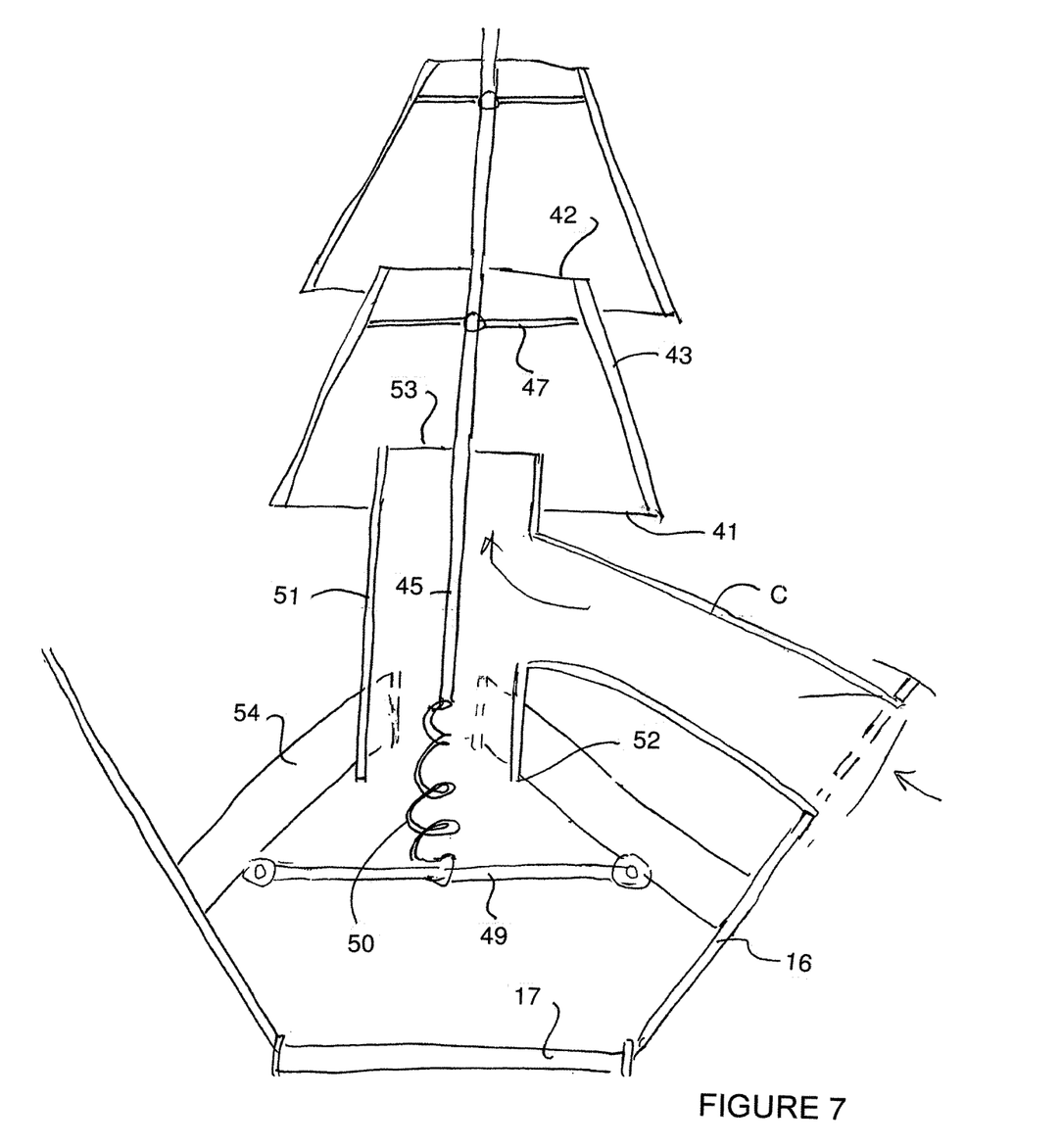
FIG. 7 is a cross-sectional view on an enlarged scale of the lower part of the duct of FIG. 5.

Turning now to FIGS. 5, 6 and 7, the arrangement described above is used in conjunction with an air injection conduit shown previously at C for supplying air under pressure and an elongate duct shown previously at D for mounting within the bin at a position spaced inwardly from the bin wall by which air is injected into an area at or adjacent the center of the bin for movement through the grain to the exterior wall for discharge.

The duct indicated in these figures at 40 comprising a series of generally frustoconical duct pieces 401, 402 etc. arranged in a row from a position adjacent the roof 11 to a position adjacent the bin bottom 16.

Each of the duct pieces has a bottom mouth 41 larger than a top mouth 42 so that the top mouth of each fits inside the bottom mouth of the next upper duct piece. The peripheral wall 43 is typically conical so that the surface lies on a cone at a predetermined cone angle but it will be appreciated that the specific shape of the wall 43 does not interfere with the operation provided that the pieces slightly overlap.

The pieces can be formed from an imperforate material so that the air from the conduit injected into the duct can escape between the duct pieces while particulate material in the bin is prevented by the overlap between the duct pieces from entering the open top mouth. Alternatively the pieces can be formed of a perforated material which has holes sufficiently small to allow air escape while preventing grain penetration.

The duct is formed in individual pieces so that it has some flexibility between each piece and the next to allow the duct to accommodate side loads applied to the duct during unloading. Typically the material discharging from a bin even from a center hopper bottom does not discharge evenly so that material can build up on one side and apply a significant side load onto the duct. In this arrangement the flexibility of the duct allows it to accommodate these side loads.

The duct is carried on a support system for attaching an upper end of the duct to the roof to be suspended therefrom. Specifically as shown, the support system includes a cable 45 passing centrally through the duct pieces and suspended at an upper end from the roof and connected to each duct piece so as to carry the duct pieces in the row. The cable is attached at the upper end to the roof by suitable hanging straps 44 connected adjacent to or at the top roof ring 46 at the top filler opening 47. The cable is connected to each of the duct pieces by arms 47 extending radially outwardly from the cable to the peripheral wall typically at or adjacent the pen upper mouth 42. As shown the top piece may be closed at the top wall 48 so as to confine the air in the duct to escape from the lower pieces rather than directly into the roof space. The lower pieces may also be constricted by varying amounts to direct more air in the lower parts of the duct.

The cable is also connected at a bottom end to the bin bottom so as to be held under tension to reduce side to side movement of the cable and therefore the pieces under loads from the material. One method to attach the cable is by way of a cross member 49 extending across the bin adjacent the bin bottom. In order to allow some side movement sufficient to prevent damage to the structure, the cable is connected to a spring 50 to provide tension therein while allowing the length of the cable to increase under heavy loads so that the pieces can diverge to one side. The spring is shown at the bottom but it may be located at the top or there may be two or more springs as required.

A tube portion 51 is provided at the bottom of the duct adjacent the bin bottom arranged to be fixed to the bin bottom and standing upwardly therefrom. The conduit C is arranged to inject air under pressure from the blower B into the tube so that the air moves upwardly in the tube. An upper end 53 of the tube projects into the open bottom mouth 41A of a bottom one of the pieces so that the air rises in the duct to escape into the grain. The conduit C connects to a side of the tube 51 so as to not interfere with the cable 45 and its connection to the spring and the bottom mounting. The bottom end 52 of the tube 51 is spaced from the bin bottom so as to allow discharge underneath the bottom of the tube.

As shown previously, the bin bottom is a conical hopper bottom 16 with a discharge opening 17 at an apex of the hopper bottom where the grain discharge passes under the tube. The tube is connected to the hopper bottom by three inclined legs 54 at spaced positions around the discharge opening which extend outwardly and downwardly from the outer surface of the tube to the inner surface of the hopper bottom at positions spaced around the discharge 17.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An aeration apparatus for mounting in a storage bin for particulate material where the storage bin comprises a bin wall standing up from a bin bottom and a bin roof covering a top edge of the bin wall;

the aeration apparatus comprising:

an air injection conduit for supplying air under pressure;

an elongate duct for mounting within the storage bin at a position spaced inwardly from the bin wall;

the duct comprising a series of generally frustoconical duct pieces arranged in a row from a position adjacent the roof to a position adjacent the bin bottom;

a support system for attaching an upper end of the duct to the roof to be suspended therefrom and connected to each duct piece in the row to support all duct pieces in the row;

each of the duct pieces having a bottom mouth larger than a top mouth so that the top mouth of each fits inside the bottom mouth of the next upper duct piece so that air from the conduit injected into the duct can escape between the duct pieces while particulate material in the storage bin is prevented by overlap between the duct pieces from entering the open top mouth;

a tube portion at the bin bottom arranged to be fixed thereto standing upwardly therefrom;

the air injection conduit being arranged to inject said air under pressure into the tube portion;

an upper end of the tube being arranged to project into the open bottom mouth of a bottom one of the duct pieces;

and a pulling member applying a downward force onto at least the bottom one of the duct pieces to pull the bottom one of the duct pieces into position over the tube portion.

2. The aeration apparatus according to claim 1 wherein the air injection conduit connects to a side of the tube portion.

3. The aeration apparatus according to claim 1 wherein the tube is spaced from the bin bottom.

4. The aeration apparatus according to claim 3 wherein the bin bottom is a conical hopper bottom with a discharge opening at an apex of the hopper bottom and with the tube portion having a bottom end located above the discharge opening.

5. The aeration apparatus according to claim 4 wherein the tube portion is connected to the hopper bottom by a plurality of inclined legs at spaced positions around the discharge opening.

6. The aeration apparatus according to claim 1 wherein the support system comprises a cable passing centrally through the duct pieces and suspended at an upper end from the roof and connected to each duct piece so as to carry the duct pieces in the row.

7. The aeration apparatus according to claim 6 wherein the cable is connected to each of the duct pieces by arms extending outwardly from the cable.

8. The aeration apparatus according to claim 6 wherein the pulling member comprises a portion of the cable which is connected at a bottom end to a position at or adjacent the bin bottom so as to be under tension to pull said at least the bottom one of the duct pieces into position over the tube portion.

9. The aeration apparatus according to claim 6 wherein the pulling member comprises a spring which is attached to the cable to provide tension therein.

10. The aeration apparatus according to claim 9 wherein the spring is connected from a bottom end of the cable to a cross member at the bin bottom.

11. The aeration apparatus according to claim 1 wherein the bin wall has a series of perforated openings which allow escape of the air form the duct.

12. An aeration apparatus for mounting in a storage bin for particulate material where the storage bin comprises a bin wall standing up from a bin bottom and a bin roof covering a top edge of the bin wall;
the aeration apparatus comprising:
an air injection conduit for supplying air under pressure;
an elongate duct for mounting within the storage bin at a position spaced inwardly from the bin wall;
the duct comprising a series of generally frustoconical duct pieces arranged in a row from a position adjacent the roof to a position adjacent the bin bottom;
a support system for attaching an upper end of the duct to the roof to be suspended therefrom;
each of the duct pieces having a bottom mouth larger than a top mouth so that the top mouth of each fits inside the bottom mouth of the next upper duct piece so that air from the conduit injected into the duct can escape between the duct pieces while particulate material in the bin is prevented by overlap between the duct pieces from entering the open top mouth;
wherein the support system comprises a cable passing centrally through the duct pieces and suspended at an upper end from the roof and connected to each of said duct pieces so as to carry the duct pieces in the row.

13. The aeration apparatus according to claim 12 wherein the cable is connected to each of the duct pieces by arms extending outwardly from the cable.

14. The aeration apparatus according to claim 12 wherein the bin bottom is a conical hopper bottom with a discharge opening at an apex of the hopper bottom with a bottom end of the duct located above the discharge opening.

15. The aeration apparatus according to claim 12 including a tube connected to the hopper bottom by a plurality of inclined legs at spaced positions around the discharge opening and standing upwardly therefrom such that an upper end of the tube projects into the duct.

16. The aeration apparatus according to claim 12 wherein the bin wall has a series of perforated openings which allow escape of the air from the duct.

17. An aeration apparatus for mounting in a storage bin for particulate material where the storage bin comprises a bin wall standing up from a bin bottom and a bin roof covering a top edge of the bin wall;
the aeration apparatus comprising:
an air injection conduit for supplying air under pressure;
an elongate duct for mounting within the storage bin at a position spaced inwardly from the bin wall;
the duct comprising a series of generally frustoconical duct pieces arranged in a row from a position adjacent the roof to a position adjacent the bin bottom;
a support system for attaching an upper end of the duct to the roof to be suspended therefrom;
each of the duct pieces having a bottom mouth larger than a top mouth so that the top mouth of each fits inside the bottom mouth of the next upper duct piece so that air from the conduit injected into the duct can escape between the duct pieces while particulate material in the bin is prevented by overlap between the duct pieces from entering the open top mouth;
wherein the support system comprises a cable passing centrally through the duct pieces and suspended at an upper end from the roof and connected to each duct piece so as to carry the duct pieces in the row;
wherein the cable is connected at a bottom end to a position at or adjacent the bin bottom so as to be under tension.

18. The aeration apparatus according to claim 17 wherein the cable is connected at one end to a spring to provide tension therein.

19. The aeration apparatus according to claim 18 wherein the spring is connected from the bottom end of the cable to a cross member adjacent at the bin bottom.

20. The aeration apparatus according to claim 17 wherein the cable is connected to each of the duct pieces by arms extending outwardly from the cable.

21. The aeration apparatus according to claim 17 wherein the cable is connected at one end to a spring to provide tension therein.

22. The aeration apparatus according to claim 21 wherein the spring is connected from a bottom end of the cable to a cross member adjacent the bin bottom.

23. The aeration apparatus according to claim 17 wherein the bin bottom is a conical hopper bottom with a discharge opening at an apex of the hopper bottom with a bottom end of the duct located above the discharge opening.

24. The aeration apparatus according to claim 23 including a tube connected to the hopper bottom by a plurality of inclined legs at spaced positions around the discharge opening and standing upwardly therefrom such that an upper end of the tube projects into the duct.

25. The aeration apparatus according to claim 17 wherein the bin wall has a series of perforated openings which allow escape of the air from the duct.

* * * * *